(12) United States Patent
Johnson

(10) Patent No.: US 7,434,452 B1
(45) Date of Patent: Oct. 14, 2008

(54) METHOD OF ENGINE CALIBRATION

(76) Inventor: Charles E. Johnson, 6363 Grover St., #61, Omaha, NE (US) 68106-4319

( * ) Notice: Subject to any disclaimer, the term of this patent is extended or adjusted under 35 U.S.C. 154(b) by 112 days.

(21) Appl. No.: 11/507,765

(22) Filed: Aug. 22, 2006

(51) Int. Cl.
*G01M 15/00* (2006.01)
(52) U.S. Cl. .................................... 73/114.79
(58) Field of Classification Search ............ 73/114.02, 73/114.31, 114.32, 114.37, 114.77, 114.79, 73/115.01
See application file for complete search history.

(56) References Cited

U.S. PATENT DOCUMENTS

| | | | |
|---|---|---|---|
| 4,580,446 A * | 4/1986 | Ansteth | 73/116 |
| 6,272,910 B1 * | 8/2001 | Noland | 73/116 |
| 2003/0110845 A1 * | 6/2003 | Kumagai et al. | 73/116 |
| 2006/0010970 A1 * | 1/2006 | Candeo | 73/116 |
| 2006/0075984 A1 * | 4/2006 | Goracy | 123/90.27 |

* cited by examiner

*Primary Examiner*—Eric S McCall

(57) ABSTRACT

A method of engine calibration is provided for use with an engine having a plurality of combustion cylinders and a valve train having individual components dedicated to each of the plurality of combustion cylinders. One or more anomalous cylinders are first identified, among the plurality of combustion cylinders, that are operating at a level above or below a common baseline. Changes are then made to the individual components within the valve train, associated with the one or more anomalous cylinders, to provide the one or more anomalous cylinders with individual components having different operative ratings from their respective initial operative ratings so that the anomalous cylinders operate at or closer to a common baseline.

4 Claims, 4 Drawing Sheets

METHOD OF ENGINE CALIBRATION

BACKGROUND

Balanced combustion with multi-cylinder, poppet valve internal combustion engines is important for reliable, emission-compliant operation. The typical reciprocating engine is designed to proportionately distribute the compressor and auxiliary loads between the engine's power cylinders. Unfortunately, a number of factors introduce variability into the cylinder-to-cylinder combustion process. One such factor is intake manifold design.

Several benefits are realized when an engine's combustion is balanced. First, combustion temperatures can be controlled, which stabilizes exhaust emissions. Second, fuel consumption can be minimized. Third, excessive stress on engine components, created by high cylinder pressures, is minimized, maximizing engine reliability. Fourth, engine balancing controls peak combustion pressures within the cylinders. Finally, the horsepower load is distributed proportionately across the cylinders.

Historically, a number of methods have been employed to help reduce cylinder-to-cylinder variability. However, most of these methods involve making inaccurate adjustments to the fuel/air delivery system in an attempt to direct higher flow toward "starving" cylinders and lessen the flow directed to "over-powered" cylinders. One method rotates the position of the carburetor with respect to the manifold. Another method involves changing the size of the jets inside the carburetor. Other methods swap manifolds, experimenting with various wave harmonics. Still another method involves the installation of air flow balancing valves in the manifold, upstream of the cylinders' fuel injection valves.

A certain amount of carbon buildup is normal in all engines.

Most late-model engines with computer controls have one or more knock sensors to detect detonation. If a knock sensor picks up vibrations within a certain frequency range, it signals the computer to back off ignition timing a certain number of degrees until the vibrations go away. Knock retard works up to a point, but the trade off is reduced performance and fuel economy as long as the timing is retarded.

The "valve train" within poppet valve internal combustion engines, typically includes the camshaft, valve lifters, valves, valve springs, retainers, rocker arms and shafts. On engines with the camshaft in the cylinder block, the valve train also includes pushrods. Overhead cam engines may use more than one camshaft per cylinder head. Engines use different valve configurations, such as two, three, or four valves per cylinder. These various valve arrangements are used for different engine breathing requirements. Changes to the valve train, such as exchanging camshafts, increasing the ratios of each of the rocker arms, and upgrading valve train components to reduce friction, and reduce weight have been implemented to change an engine's horsepower, fuel consumption rate, emissions levels and the like. Uniform changes along the valve train, using readily available, off-the-shelf parts, can be relatively quick and inexpensive to implement by professional mechanics and shade-tree mechanics alike. However, such changes fail to adequately address cylinder to cylinder variability.

Accordingly, what is needed is a novel method of engine calibration to reduce cylinder to cylinder variability that can be used in mass production settings and that is relatively quick and inexpensive to implement in retrofit situations by mechanics of varying abilities. However, such a method should effectively contribute to engine balance.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

The present method of engine calibration is preferably performed on an engine having a plurality of combustion cylinders and a valve train having individual components dedicated to each to each of the plurality of combustion cylinders. Individual components within the valve train, such as one or more camshafts, rocker arms and valves are provided with initial operative ratings. The user employs various known electronic, mechanical and/or visual methods of identifying one or more anomalous cylinders that are operating at a level above or below a common baseline desired for the engine. Individual components within the valve train, associated with the one or more anomalous cylinders, are redesigned and installed to provide the one or more anomalous cylinders with individual components having different operative ratings from the initial operative ratings, such that the anomalous cylinders operate at or closer to the common baseline.

In one embodiment, the individual components within the valve train are redesigned and installed to provide the valve train with at least one respecified operative rating among the individual components. In one aspect, only the individual components within the valve train associated with the one or more anomalous cylinders are changed. In another aspect, the individual components to be redesigned and installed may include at least one camshaft, to provide a camshaft having at least one cam with a different profile, and/or at least one of the plurality of rocker arms, to a rocker arm having a different rocker arm ratio. Various combinations of redesigned components are contemplated to accommodate factors presented with each specific engine.

It is therefore a principal object of the present invention to provide a method of engine calibration that causes anomalous cylinders within an engine to operate at or closer to a desired, common baseline.

A further object of the present invention is to provide a method of engine calibration that is relatively simple and inexpensive to implement.

Still another object of the present invention is to provide a method of engine calibration that primarily utilizes newly specified parts installed in an engine's valve train.

Yet another object of the present invention is to provide a method of engine calibration that corrects anomalous cylinders toward a common baseline by redesigning and installing only individual valve train components associated with the anomalous cylinders.

A further object of the present invention is to provide a method of engine calibration that adjusts engine performance by specifying intake valve rocker arms with operating ratios suited to the requirements of each of the several cylinders.

Still another object of the present invention is to provide a method of engine calibration that adjusts engine performance by providing a camshaft with individually designed intake valve operating cams.

These and other objects of the present invention will be apparent after consideration of the Detailed Description and Figures herein.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
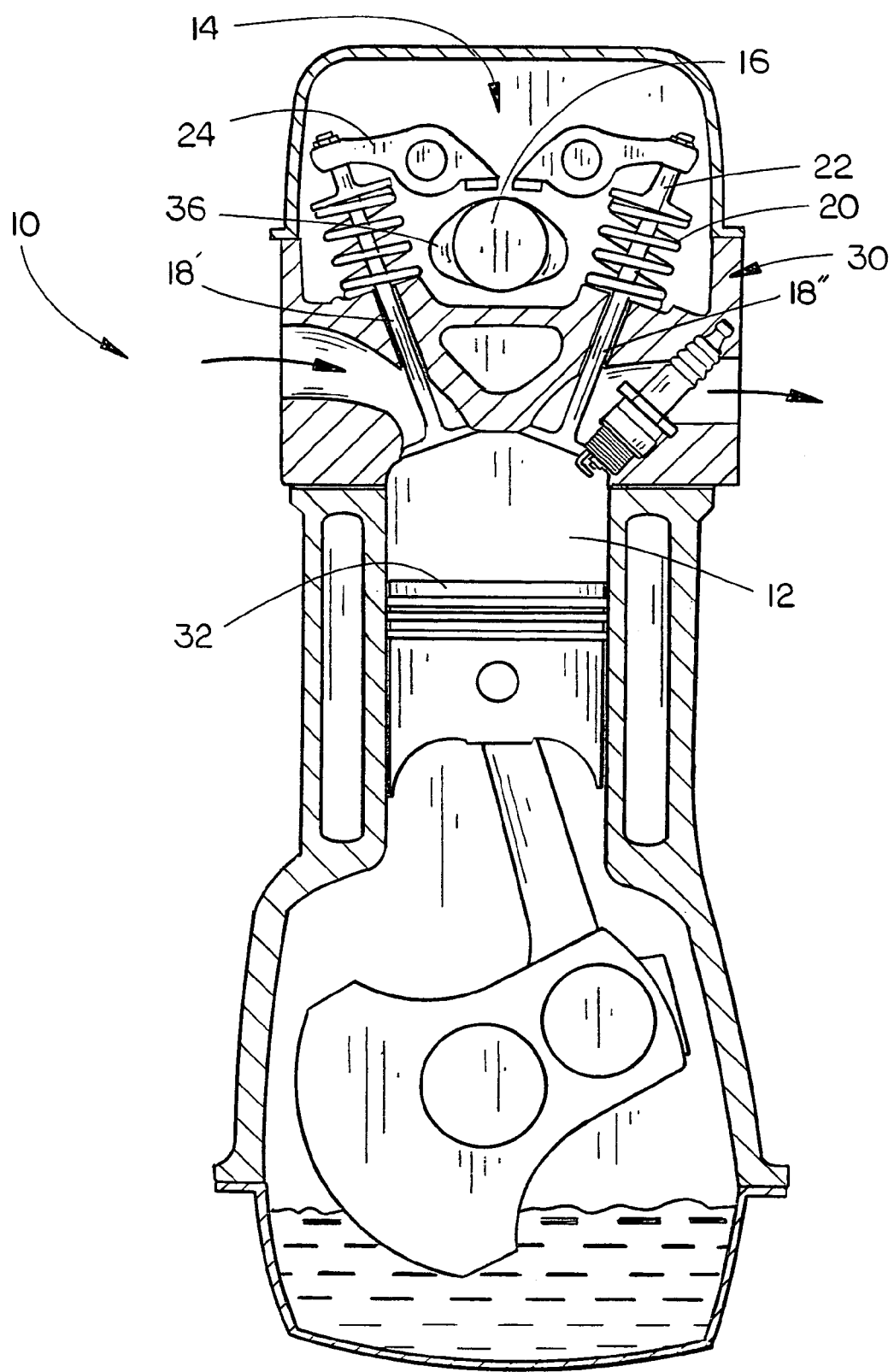
FIG. 1 depicts a cut-away, front elevation view of one engine type having a valve train with initial operating values.
Figure 3:
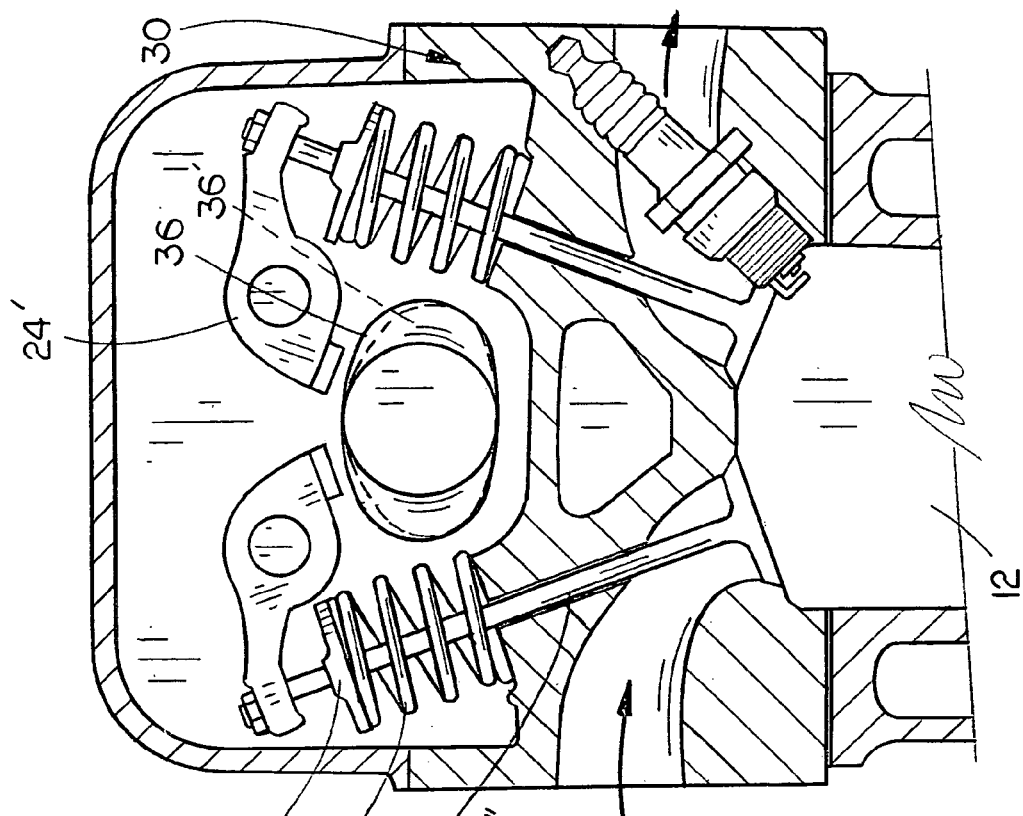
FIG. 3 depicts an isometric, cut-away view of the valve train depicted in FIG. 2 as it could be changed according to one embodiment of the present invention.
Figure 2:
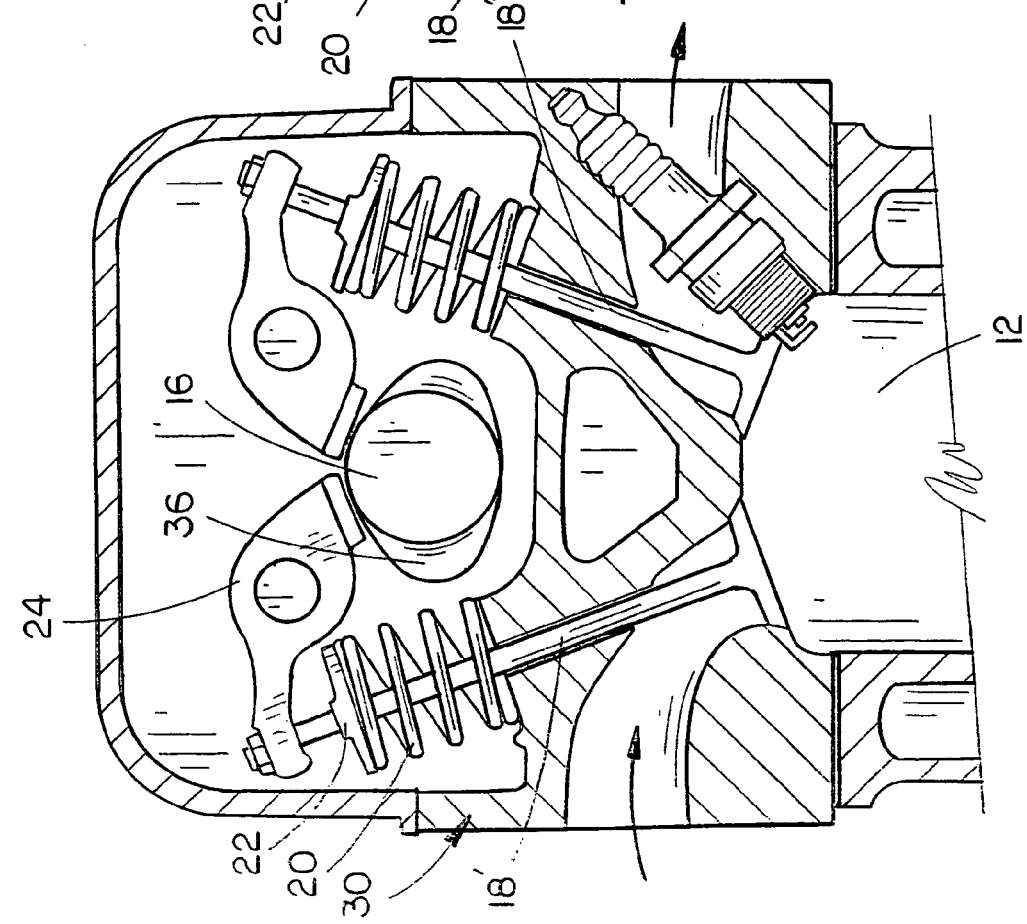
FIG. 2 depicts an isometric, cut-away view of the valve train depicted in FIG. 1.
Figure 4:
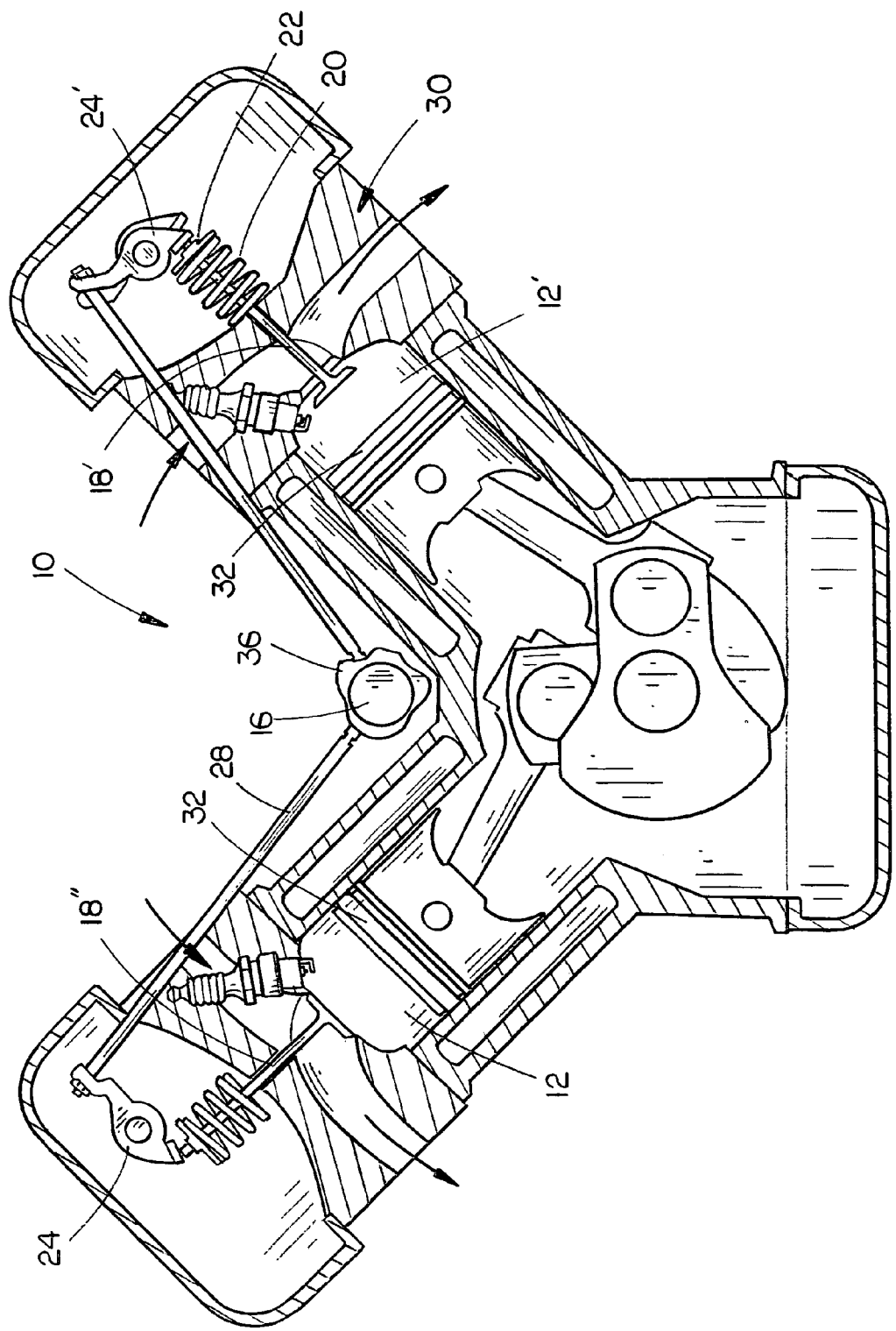
FIG. 4 depicts a cut-away, front elevation view of another engine type having a valve train with initial operating values.
Figure 5:
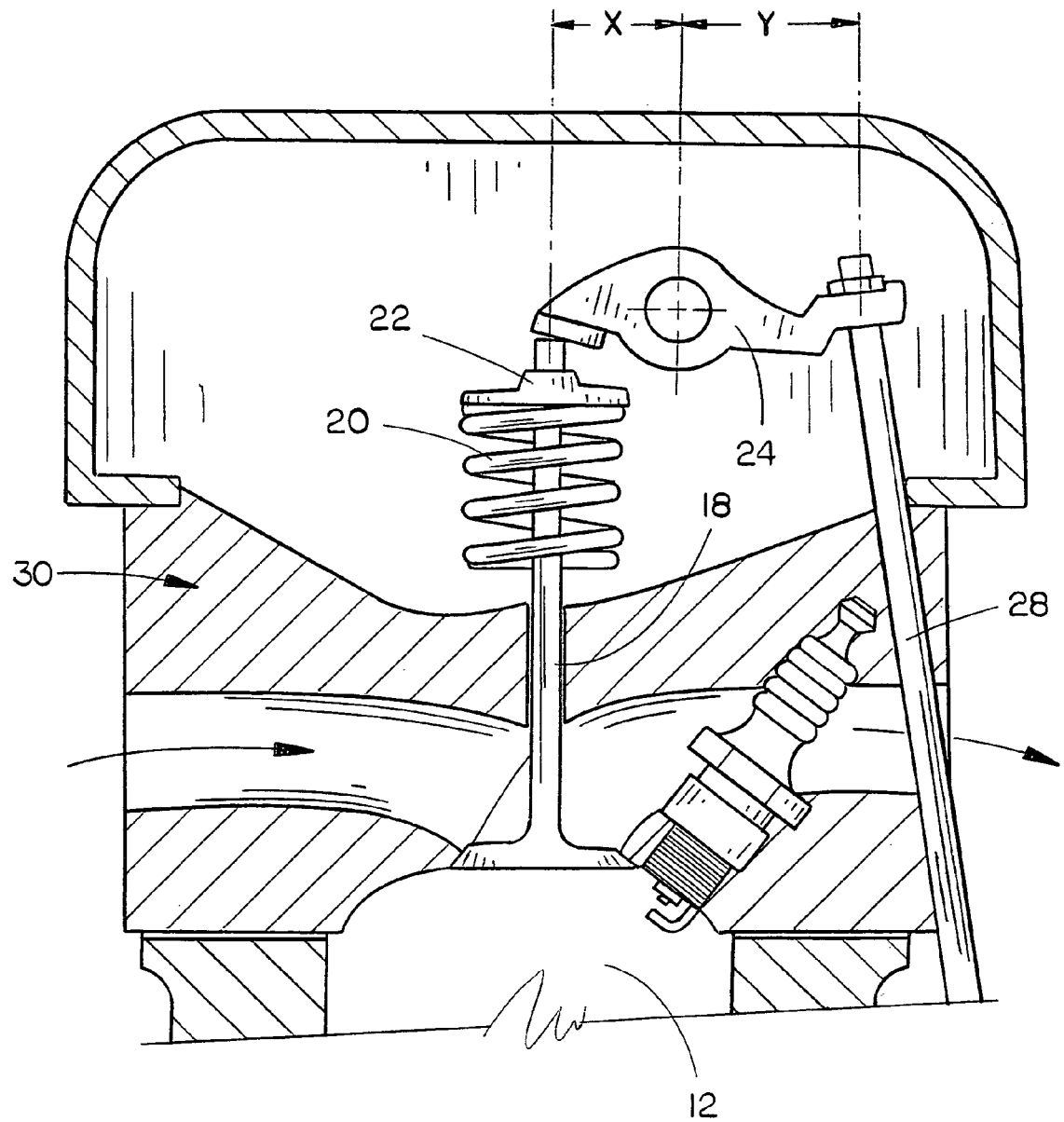
FIG. 5 depicts a partial, isometric view of the valve train depicted in FIG. 4 as it could be changed according to one embodiment of the present invention.

The present method of engine calibration is provided for use with an engine 10, of various types and configurations, but at least having a plurality of combustion cylinders 12 and a valve train 14, having individual components dedicated to each of the plurality of combustion cylinders 12. Accordingly, it is contemplated that the present method will be effective for use with engines of various configurations, such as the in-line engine depicted in FIG. 1 and the V-configured engine depicted in FIG. 4. Moreover, the method will be applicable to both gasoline and diesel fueled four-cycle engines. As such, it is contemplated that the valve train 14 will typically include at least one camshaft 16, valve lifters, a plurality of valves 18, valve springs 20, retainers 22, rocker arms 24 and shafts. On engines where the camshaft is mounted within the cylinder block, the valve train 14 will also include pushrods 28. Overhead cam engines may use more than one camshaft 16 per cylinder head 30. It is contemplated that engines may present different valve configurations, such as two, three, or more valves per cylinder. Irrespective of the cylinder and valve train arrangement presented, the present method of engine calibration will be effective.

Initially, it will be important to identify one or more anomalous cylinders 12' from the plurality of combustion cylinders 12, that are operating at a level above or below a common baseline. This may be accomplished through various known methods of inspection that may employ mechanical or electrical equipment or a simple visual inspection, which may reveal a greater or lesser amount of carbon deposits within a combustion cylinder. For example, inspection may be accomplished through chemical or temperature analysis of the exhaust gases from each individual cylinder, by means of a power balance test, or by some combination thereof. It is contemplated that the "common baseline" may be provided in the form of an analysis of the several individual cylinder operating pressures, or by analysis of the power output of the several cylinders in conjunction with exhaust temperature readings of the individual cylinders.

For example purposes only, the following detailed description for employing the methods of the present invention will be employed on common, four-stroke engines. As depicted in the embodiments shown in FIGS. 1 and 4, a camshaft 16 in a four-stroke engine 10 controls the opening and closing of the valves 18 in the cylinder head 30, which in turn allows the fuel/air mixture into the engine prior to combustion and allows the spent gases out of the engine 10 following combustion. During combustion, the two valves 18 associated with each combustion cylinder are preferably closed to allow the ignited gases to press down on the piston 32, producing horsepower. Theoretically, it is desirable for the inlet valve 18' to open when the piston 32 is at top-dead-center after the exhaust stroke, and then close for the compression stroke when the piston 32 is at bottom-dead-center in the cylinder. The exhaust valve 18" would the preferable open at bottom-dead-center, following the power stroke, and remain open until top-dead-center of the exhaust stroke, at which time the cycle would start again.

Inlet duration, measured in degrees of crank revolution, defines the period for which the inlet valve 18' is open. Theoretically, a preferred inlet duration would be 180 degrees. Exhaust duration, also measured in degrees of crank revolution, defines the period for which the exhaust valve 18" is open. Likewise, a preferred exhaust duration would be 180 degrees. Several factors, however, greatly affect the degrees of duration used in practice. For example, both the fuel/air mixture inducted into the engine and the exhaust gases being expelled from the engine have mass, which is affected by inertia. The valve train 14 also has a mass. Accordingly, valve train movement and the movement of gasses in and out of the engine cannot occur instantaneously. Keeping the inlet valve 18' open beyond bottom-dead-center allows more fuel/air mixture into the combustion cylinder 12, despite the fact that the piston is rising to compress the fuel/air mixture. Similarly, if the exhaust valve 18" were to close at top-dead-center on the exhaust stroke, spent gases would still remain in the cylinder 12. However, by leaving the exhaust valve 18" open past top-dead-center, despite the fact that the piston 32 is now descending to induct new fuel/air mixture, additional spent gasses are expelled from the cylinder 12.

As an engine begins to run faster, it becomes more sensitive to the inertia of the incoming and outgoing gases. The duration of the camshaft 16 in a normal production engine 10 is typically around 255-265 degrees of crankshaft rotation, which is approximately 80 degrees more than the theoretical engine. It is clear that the higher the valves 18 are lifted off their seats, the greater amount of flow is permitted in and out of the cylinder 12.

In the end, camshaft swaps, rocker arm swaps, and the like may provide greater high-end power or low-end efficiency but these "swap" solutions enact uniform changes to all of the camshaft cams, rocker arm ratios and the like for each of the engine's cylinders.

Where one or more anomalous cylinders 12' are identified as operating at a level above or below the desired common baseline, individual components within the valve train 14, specifically associated with the one or more anomalous cylinders 12', may be redesigned and installed to bring the anomalous cylinders 12' in line with the desired common baseline. In one specific example, knocking had developed within a particular engine 10 when high octane leaded gasoline became unavailable, and only 87 octane gasoline was available. The anomalous cylinder was identified by several methods of inspection. The combustion chamber had been blasted clean of carbon by the knocking process, the related connecting rod bearing showed abnormal wear, and inspection of the intake manifold showed the manifold passage of the problem cylinder was the shortest and most direct passage of the several passages of the intake manifold. These conditions indicated high cylinder pressure in the problem cylinder. A standard production rocker arm 24, having a ratio of 1.54:1 was associated with the anomalous cylinder 12'. A rocker arm 24', having a rocker arm ratio of 1.43:1 was installed in place of the production rocker arm 24. The remaining rocker arms 24 and other components within the valve train 14 were left alone. Reinstallation of the cylinder head 30 and testing of the engine 10 demonstrated successful resolution of the knocking problem within the anomalous cylinder 12'. The lower ratio of rocker arm 24' reduced the lift of the associated intake valve 18', correcting for the overbalance of fuel/air mixture provided to the anomalous cylinder 12'. This brought the anomalous cylinder 12' to the common operating baseline for the engine 10, providing engine balance. It is contemplated that a modification to the profile of the camshaft 16, through grinding and reshaping of the cam 36 associated with the anomalous cylinder 12' to produce a different cam 36', would have produced similar results. Providing a new camshaft 16 with a custom ground cam 36' for the intake valve of the anomalous cylinder would also prove successful. To that extent, it is contemplated that both the rocker arm ratio and the profile of the cam 36 could have been redesigned and installed to achieve the same effect. While not required in this particular example, it is contemplated that such changes may also require redesigning associated components within the valve train 14, such as pushrods 28, followers 34, valves 18 or valve springs 20.

It is contemplated that more than one anomalous cylinder 12' may be addressed at one time by redesigning and installing valve train components associated with those cylinders. More specifically, individual valve train components having initial operative ratings are replaced or modified to provide the anomalous cylinders 12' with associated components with different operative ratings. Some instances may require the different operative ratings to be comprised of features that provide higher or lower duration, valve lift or overlap for each of the anomalous cylinders 12', while other situations may present a mix of changes resulting in higher duration, valve lift and overlap for one or more anomalous cylinders 12' and lower duration, valve lift and overlap for other anomalous cylinders 12', simultaneously.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

What is claimed is:

1. A method of calibrating an engine, this method comprising:
    (a) providing an engine having a plurality of combustion cylinders, and a valve train having individual components dedicated to each of said plurality of combustion cylinders
    (b) said individual components within said valve train having initial operative ratings;
    (c) identifying one or more anomalous cylinders, from said plurality of combustion cylinders, that operate at a level above or below a common baseline;
    (d) redesigning and installing individual components within said valve train, associated with said one or more anomalous cylinders, to provide said one or more anomalous cylinders with individual components having different operative ratings from said initial operative ratings, such that there be at least one intake valve, in at least one of the several combustion cylinders in said engine, with an operative rating different from the operative ratings of the remainder of the intake valves in said engine, so that said anomalous cylinders operate at or closer to said common baseline.

2. The method of claim 1 wherein the individual components to be redesigned and installed include redesigning and installing at least one of said plurality of rocker arms to a rocker arm having a ratio different from said initial ratio.

3. The method of claim 1 wherein the individual components to be redesigned and installed include redesigning and installing said at least one camshaft to provide a camshaft having at least one cam with a profile different from said initial profile.

4. The method of claim 3 wherein the individual components to be redesigned and installed further include redesigning and installing at least one of said plurality of rocker arms to a rocker arm having a ratio different from said initial ratio.

* * * * *